United States Patent
Weh et al.

(10) Patent No.: US 10,773,697 B2
(45) Date of Patent: Sep. 15, 2020

(54) PEDAL TRAVEL SIMULATOR AND HYDRAULIC BLOCK INCLUDING A PEDAL TRAVEL SIMULATOR

(71) Applicant: Robert Bosch GmbH, Stuttgart (DE)

(72) Inventors: Andreas Weh, Sulzberg (DE); Harald Guggenmos, Immenstadt/Seifen (DE); Martin Hoss, Sonthefen (DE); Matthias Mayr, Rettenberg (DE); Simon Hansmann, Plymouth, MI (US); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/342,377

(22) PCT Filed: Sep. 26, 2017

(86) PCT No.: PCT/EP2017/074384
§ 371 (c)(1),
(2) Date: Apr. 16, 2019

(87) PCT Pub. No.: WO2018/071182
PCT Pub. Date: May 24, 2018

(65) Prior Publication Data
US 2019/0232934 A1     Aug. 1, 2019

(30) Foreign Application Priority Data
Nov. 16, 2016   (DE) .................. 10 2016 222 562

(51) Int. Cl.
*B60T 8/40*     (2006.01)
*F15B 15/24*    (2006.01)

(52) U.S. Cl.
CPC .............. *B60T 8/409* (2013.01); *F15B 15/24* (2013.01)

(58) Field of Classification Search
CPC ...... B60T 8/4081; B60T 8/409; B60T 8/4086; B60T 7/042
See application file for complete search history.

(56) References Cited

U.S. PATENT DOCUMENTS 9,387,836 B2 *   7/2016   Ryu ................... B60T 8/409

FOREIGN PATENT DOCUMENTS

| JP | 2005112034 A  | 4/2005 |
| WO | 2016009968 A1 | 1/2016 |
| WO | 2016132938 A1 | 8/2016 |

OTHER PUBLICATIONS

International Search Report for PCT/EP2017/074384, dated Dec. 8, 2017.

* cited by examiner

*Primary Examiner* — Abiy Teka
(74) *Attorney, Agent, or Firm* — Norton Rose Fulbright US LLP; Gerard Messina

(57) ABSTRACT

A pedal travel simulator for a hydraulic power vehicle braking system. For the purpose of adapting to different main brake cylinders and of changing a spring characteristic curve, a stop is provided to be pressed into a piston of the pedal travel simulator. A pressing-in depth of the stop delimits a piston stroke.

15 Claims, 1 Drawing Sheet

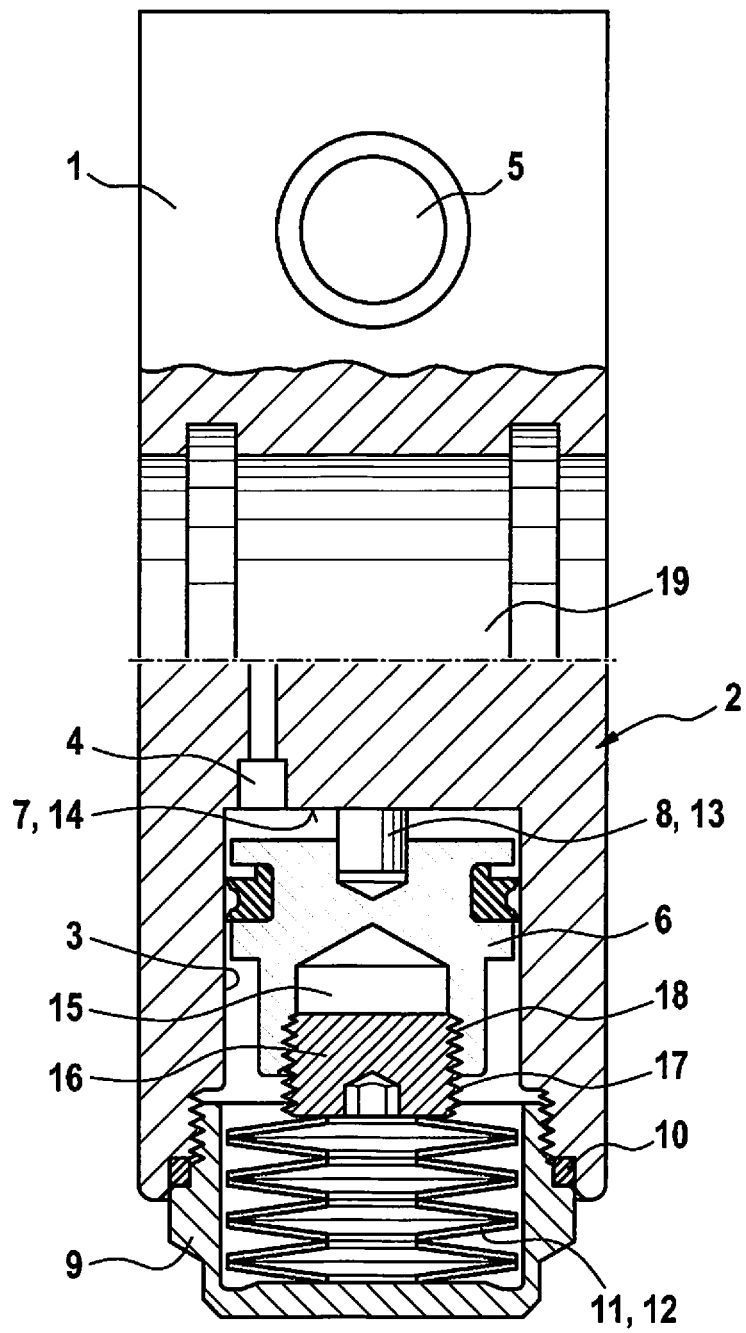

PEDAL TRAVEL SIMULATOR AND HYDRAULIC BLOCK INCLUDING A PEDAL TRAVEL SIMULATOR

FIELD

The present invention relates to a pedal travel simulator.

BACKGROUND INFORMATION

In power-actuated hydraulic vehicle braking systems, pedal travel simulators make a pedal travel (a lever travel in the case of a parking brake) possible upon actuation of a main brake cylinder. In the case of a power actuation, the main brake cylinder is used as a setpoint generator for a hydraulic brake pressure which is not generated with the aid of the main brake cylinder, but with the aid of external energy, for example with the aid of a hydraulic pump. The main brake cylinder is hydraulically separated from the vehicle braking system in the case of a power brake application, for example by closing a valve, and displaces brake fluid into the pedal travel simulator upon actuation.

A pedal travel simulator usually includes a cylinder and a piston, which is displaceable within the cylinder, as well as a piston spring which acts upon the piston against a displacement direction. In the case of a power actuation of a vehicle braking system, the pedal travel simulator is hydraulically connected to a main brake cylinder which displaces brake fluid into the cylinder of the pedal travel simulator upon actuation, whereby the piston is displaced in the cylinder against a spring force of the piston spring. Here, a spring rate of the piston spring, i.e. a spring force as a function of a deflection of the piston spring, essentially determines a pedal characteristic, i.e., an actuating force as a function of an actuating path of the main brake cylinder. The pedal travel simulator may always be hydraulically connected to the main brake cylinder or become hydraulically connected to and disconnected from the main brake cylinder by opening and closing a simulator valve. The deflection of the piston spring is the elastic deformation of same due to the displacement of the piston in the cylinder which results in a spring force or a change in a spring force used by the piston spring to act upon the piston against the displacement.

SUMMARY

An example pedal travel simulator according to the present invention includes an adjustable stroke limiter for its piston. With the aid of the stroke limiter, a return stroke of the piston or a turning point, or a position of the piston in the case of an unpressurized pedal travel simulator is adjustable. The pedal travel simulator may thus be adapted to different main brake cylinders having different diameters and/or different lengths, for example. A greater stroke of the piston of the pedal travel simulator is, for example, adjusted for a main brake cylinder having a larger diameter or a longer piston displacement to be able to accommodate a larger brake fluid volume from the main brake cylinder. A characteristic curve of the pedal travel simulator is also affected by the piston stroke and, in turn, has an effect on a characteristic curve of the main brake cylinder. The characteristic curve of the pedal travel simulator is a function of a hydraulic pressure of the accommodated brake fluid volume. The characteristic curve of the main brake cylinder, which is also referred to as a pedal characteristic curve or a pedal characteristic, is a function of a piston travel or a pedal travel of a piston force or pedal force.

Advantageous embodiments and refinements of the present invention are described herein.

One refinement of the present invention which in general may also be implemented without the adjustable stroke limiter provides for an adjustable spacer of the piston for a piston spring. The piston or the pedal travel simulator is thus adaptable to piston springs of different lengths and a pretension of the piston spring may be adjusted. Both have an effect on the characteristic curve of the pedal travel simulator and of a main brake cylinder which is connected to the pedal travel simulator. Ideally, the spacer does not change a stroke of the piston, so that the stroke of the piston and the pretension of the piston spring may be adjusted independently of one another, i.e., a change in the stroke of the piston does not change the pretension of the piston spring and vice versa.

One advantage of the present invention is that different piston strokes and characteristic curves may be implemented with the same parts, i.e., without changing the piston, cylinder, and using the same piston spring.

The pedal travel simulator is preferably integrated into a hydraulic block of a slip control unit of a hydraulic vehicle braking system, in particular a power vehicle braking system. Such hydraulic blocks are conventional; they are usually cuboid-shaped metal blocks which are drilled according to a hydraulic circuit diagram of the vehicle braking system or of the slip control unit of a vehicle braking system. The hydraulic blocks are equipped with solenoid valves, hydraulic pumps, and other hydraulic components of the slip control unit. Such hydraulic blocks are conventional and will not be explained here in greater detail.

BRIEF DESCRIPTION OF THE DRAWING

The present invention is explained in greater detail below on the basis of one specific embodiment illustrated in the FIGURE.

FIG. 1 shows a longitudinal section of a hydraulic block of a slip control unit of a hydraulic power vehicle braking system including a pedal travel simulator according to the present invention.

DETAILED DESCRIPTION OF EXAMPLE EMBODIMENTS

Hydraulic block 1 according to the present invention which is illustrated in FIG. 1 is provided for a slip control unit and a power actuation of a hydraulic power vehicle braking system which is incidentally not shown. Hydraulic block 1 is a cuboid-shaped metal block which is shown without any equipment apart from a pedal travel simulator 2 to be elucidated. Hydraulic block 1 has a bore (not visible in the drawing) according to a hydraulic circuit diagram of the vehicle braking system. It is equipped with hydraulic components (not in the FIGURE) for the power actuation and of the slip control unit, such as solenoid valves, a main brake cylinder including one or multiple pistons, a power cylinder including a piston, and pedal travel simulator 2 which are hydraulically interconnected through the bore according to the hydraulic circuit diagram of the vehicle braking system. Since a main brake cylinder is integrated into hydraulic block 1, only hydraulic wheel brakes must be connected to hydraulic block 1 via the brake lines. Such hydraulic blocks 1 are conventional and will not be explained here in greater detail.

Hydraulic block 1 has a cylindrical blind hole as cylinder 3 of pedal travel simulator 2 at whose base 7 a bore 4 merges which hydraulically connects pedal travel simulator 2 to a main brake cylinder bore 5. A piston 6 is axially displaceably accommodated in cylinder 3.

In an orifice of cylinder 3 of pedal travel simulator 2, a bowl-shaped cylinder cover 9 is screwed in and sealed with the aid of a sealing ring 10. In cylinder cover 9, a stack of disk springs 11 is situated as piston spring 12, other springs, such as a helical pressure spring or rubber-elastic spring elements also being possible as piston spring 12 (not illustrated). In the exemplary embodiment, four disk spring pairs are stacked in the form of a disk spring pack in cylinder cover 9, disk springs 11 being oriented alternatingly in the opposite direction, i.e., the hollow sides and outer sides of disk springs 11 always face one another alternately. Disk springs 11 are supported in cylinder cover 9 and act upon piston 6 of pedal travel simulator 2 against base 7 of cylinder 3.

On its front side facing base 7 of cylinder 3, piston 6 of pedal travel simulator 2 has a coaxial blind hole into which a cylinder pin is pressed as stroke limiter 8. In unpressurized pedal travel simulator 2, stroke limiter 8 of piston spring 12 presses piston 6 against base 7 of cylinder 3. A pressing-in depth of stroke limiter 8 into the blind hole of piston 6 determines a distance of piston 6 from base 7 of cylinder 3 when stroke limiter 8 rests against base 7 of cylinder 3. The pressing-in depth of stroke limiter 8 into the blind hole of piston 6 establishes a turning point of piston 6 and a stroke of piston 6 is delimited in a return stroke direction. The return stroke direction is a displacement of piston 6 in the direction of base 7 of cylinder 3. The stroke of piston 6 is adjustable with the aid of the pressing-in depth of stroke limiter 8 into the blind hole in piston 6.

Due to adjustable stroke limiter 8, pedal travel simulator 2 may be adapted to different main brake cylinders: for example, when actuating a main brake cylinder having a larger diameter and/or a longer piston stroke and consequently a greater volume displacement of brake fluid, stroke limiter 8 of piston 6 of pedal travel simulator 2 according to the present invention may be pressed deeper into the blind hole in piston 6 and a greater stroke of piston 6 may thus be adjusted, so that pedal travel simulator 2 is capable of accommodating a larger brake fluid volume from the main brake cylinder.

Stroke limiter 8, which is adjustable in a displacement direction of piston 6 in cylinder 3 of pedal travel simulator 2, i.e., in a stroke direction of piston 6, for the purpose of adjusting or delimiting the stroke of piston 6, may generally also be understood as stop 13 of or for piston 6. Base 7 of cylinder 3 may also be understood as an abutment 14 for stop 13. The blind hole in piston 6, into which the cylinder pin forming stroke limiter 8 or stop 13 is pressed, may also be understood as an accommodation for stroke limiter 8 or stop 13. As already elucidated above, the turning point of piston 6 is established and stroke limiter 8 adjusted as a result of the pressing-in depth of stroke limiter 8 or stop 13 into the blind hole in piston 6. A cylinder pin which is pressed into a blind hole in piston 6 is not necessarily an adjustable stroke limiter. There are other possible applications, for example a stroke limiter may be screwed into a thread hole in the piston and be adjustable with the aid of screws (not illustrated). An adjustable stroke limiter may also be provided in cylinder 3, for example at base 7 of cylinder 3, instead of at piston 6 (not illustrated).

On a front side opposite, i.e. facing, piston spring 12, piston 6 of pedal travel simulator 2 has a further coaxial blind hole 15 into which a threaded bolt is screwed as spacer 16. Blind hole 15 does not have a thread until spacer 16 is screwed in; spacer 16 has a self-cutting thread 17 which cuts for itself a counter-thread into blind hole 15 in piston 6. Thread 17 of spacer 16 and the counter-thread form a screw connection 18 through which spacer 16 is shiftable and adjustable in the displacement direction or stroke direction of piston 6. Due to its self-cutting thread 17, spacer 16 is held in a clamped manner against rotation in blind hole 15 in piston 6, so that spacer 16 does not rotate on its own and does not shift inadvertently. Other possible applications for spacer 16 and its adjustability are also possible in this case.

Piston spring 12 presses against spacer 16 and acts upon piston 6 via spacer 16. Spacer 16 may be used to adjust a distance between piston spring 12 and piston 6 and thus, for example, a pretension of piston spring 12. Moreover, adjustable spacer 16 enables an adaption to different piston springs 12; for example, piston springs 12 of different lengths and cylinder covers 9 of different lengths may be used. In the case of a disk spring pack, piston springs 12 of different lengths are possible through a varying number of disk springs 11. With the aid of adjustable spacer 16 for piston springs 12 and also adjustable stroke limiter 8 as well as the changeability of disk springs 11 or piston spring 12 and of cylinder cover 9, in which piston spring 12 is accommodated, a characteristic curve of pedal travel simulator 2 according to the present invention is adjustable. The characteristic curve is a displacement travel or stroke of piston 6 or a brake fluid volume accommodation of pedal travel simulator 2 with regard to a hydraulic pressure of brake fluid in cylinder 3 of pedal travel simulator 2. The characteristic curve of pedal travel simulator 2 determines a characteristic curve of a main brake cylinder to which pedal travel simulator 2 is connected in the case of a power actuation of a hydraulic vehicle braking system. The characteristic curve of the main brake cylinder is a pedal, lever, or piston travel with regard to a pedal or lever force upon actuation of the main brake cylinder.

If the hydraulic vehicle braking system (not illustrated) is actuated via external power, a main brake cylinder actuatable via muscle power or non-muscle power is used as the setpoint generator for a brake pressure to be generated with the aid of external energy. Upon actuation of the main brake cylinder, the brake fluid displaced from the main brake cylinder flows through bore 4 in hydraulic block 1 into cylinder 3 of pedal travel simulator 2, where it displaces piston 6 against a spring force of piston spring 12. Since in the case of a power actuation of the vehicle braking system, the main brake cylinder is hydraulically separated from the vehicle braking system by closing a valve, it cannot displace brake fluid into the vehicle braking system. Pedal travel simulator 2 makes a piston displacement possible and thus a pedal or lever travel upon an actuation of the main brake cylinder in the case of a power actuation of the vehicle braking system.

As already mentioned above, hydraulic block 1 has a main brake cylinder bore 5 which has a stepped diameter and has circumferential grooves in the specific embodiment. A main brake cylinder (not depicted), into which one or multiple piston(s) (not in the drawing) is/are introduced, of which one is displaceable for actuating the main brake cylinder or the vehicle braking system using a (foot) brake pedal (not depicted) or a (hand) brake lever (not depicted) and of which the other piston(s) is/are displaceable when acted upon by pressure, is pressed into main brake cylinder bore 5.

For power actuation, hydraulic block 1 includes a power cylinder bore 19 which is located in a different section plane than pedal travel simulator 2 and of which only a half-section is therefore visible in FIG. 1. The section is offset in such a way that pedal travel simulator 2 is visible in the axial section and power cylinder bore 19 is visible as a half-section. A power cylinder (not depicted), in which a piston is displaceably accommodated, is pressed into power cylinder bore 19. For a power actuation of the vehicle braking system, the piston is displaced with the aid of an electric motor (not depicted) via a reduction gear unit and a screw drive in the power cylinder. The electric motor is screwed to hydraulic block 1. In the case of a power actuation, the main brake cylinder is used, as already mentioned above, as the setpoint generator; a brake pressure is controlled by controlling a displacement path of the piston in the power cylinder and/or with the aid of solenoid valves.

What is claimed is:

1. A pedal travel simulator for a hydraulic power vehicle braking system, comprising:
    a piston displaceable in a cylinder by brake fluid;
    a piston spring which acts upon the piston against a displacement of the piston by the brake fluid; and
    an adjustable stroke limiter for the piston;
    wherein the stroke limiter is a stop accommodated in the piston, the stop being adjustable in its displacement direction, the piston spring configured to press the stop against, and in direct contact with, a base of the cylinder in an unpressurized state of the pedal travel simulator.

2. The pedal travel simulator as recited in claim 1, wherein the stop is pressed into a receptacle in the piston, the stroke limiter of the piston of the pedal travel simulator being adjusted by a pressing-in depth of the stop into the receptacle in the piston, the pressing-in depth determining a distance of the piston from the base of the cylinder when the stop is pressed against the base of the cylinder.

3. The pedal travel simulator as recited in claim 1, wherein the piston includes an adjustable spacer for the piston spring with which the piston spring engages.

4. The pedal travel simulator as recited in claim 3, wherein the spacer for the piston spring does not have an effect on a stroke of the piston.

5. The pedal travel simulator as recited in claim 3, wherein the spacer includes a screw connection with the piston with which it is adjustable with regard to the piston in a displacement direction of the piston.

6. The pedal travel simulator as recited in claim 5, wherein the adjustable spacer includes a self-cutting thread.

7. The pedal travel simulator as recited in claim 1, wherein the stroke limiter is a cylinder pin.

8. The pedal travel simulator as recited in claim 1, wherein the piston includes a blind hole, the piston accommodating the stop in the blind hole.

9. A hydraulic block for a hydraulic power vehicle braking system including a pedal travel simulator, the pedal travel simulator including a piston displaceable in a cylinder by brake fluid, a piston spring which acts upon the piston against a displacement of the cylinder by the brake fluid, and an adjustable stroke limiter for the piston, wherein the cylinder of the pedal travel simulator is a hole in the hydraulic block;
    wherein the stroke limiter is a stop accommodated in the piston, the stop being adjustable in its displacement direction, the piston spring configured to press the stop against, and in direct contact with, a base of the cylinder in an unpressurized state of the pedal travel simulator.

10. The hydraulic block as recited in claim 9, wherein the hydraulic block includes a main brake cylinder bore.

11. The hydraulic block as recited in claim 9, wherein the hydraulic block includes a power cylinder bore.

12. The hydraulic block as recited in claim 9, wherein the piston includes a thread hole, the piston accommodating the stop in the thread hole.

13. The hydraulic block as recited in claim 9, wherein the stroke limiter is a cylinder pin.

14. The hydraulic block as recited in claim 9, wherein the piston includes a blind hole, the piston accommodating the stop in the blind hole.

15. The hydraulic block as recited in claim 9, wherein the piston includes a thread hole, the piston accommodating the stop in the thread hole.

* * * * *